US008869116B2

(12) United States Patent
Fliek et al.

(10) Patent No.: US 8,869,116 B2
(45) Date of Patent: Oct. 21, 2014

(54) SOFTWARE TESTING CAPABILITY ASSESSMENT FRAMEWORK

(75) Inventors: Hendrik Fliek, Amsterdam (NL); Scott Christensen, Grand Blanc, MI (US); Lea Christensen, legal representative, Grand Blanc, MI (US)

(73) Assignee: Accenture Global Services Limited, Dublin (IE)

( * ) Notice: Subject to any disclaimer, the term of this patent is extended or adjusted under 35 U.S.C. 154(b) by 1948 days.

(21) Appl. No.: 11/598,197

(22) Filed: Nov. 13, 2006

(65) Prior Publication Data

US 2008/0115110 A1    May 15, 2008

(51) Int. Cl.
*G06F 11/36* (2006.01)
*G06F 11/34* (2006.01)

(52) U.S. Cl.
CPC ........ *G06F 11/3672* (2013.01); *G06F 11/3409* (2013.01); *G06F 11/3696* (2013.01); *G06F 11/3616* (2013.01)
USPC ................ 717/125; 717/132; 714/31; 714/38

(58) Field of Classification Search
CPC ......... G06F 9/44; G06F 9/46; G06F 11/0715; G06F 11/3409; G06F 11/3428; G06F 11/3616; G06F 11/3672; G06F 11/3696; G06Q 10/40; G06Q 10/50; G06Q 10/10
USPC ............... 717/100, 125, 132; 714/100, 31, 38
See application file for complete search history.

(56) References Cited

U.S. PATENT DOCUMENTS

| 7,136,792 | B2* | 11/2006 | Balz et al. .................... 703/6 |
| 7,865,388 | B2* | 1/2011 | Brumbaugh et al. ........ 705/7.13 |
| 2002/0143606 | A1* | 10/2002 | Atefi et al. ...................... 705/10 |
| 2004/0039631 | A1* | 2/2004 | Crockett et al. ................ 705/11 |
| 2005/0171831 | A1 | 8/2005 | Johnson et al. |
| 2006/0173762 | A1* | 8/2006 | Clater ............................ 705/35 |
| 2007/0156495 | A1* | 7/2007 | King ................................ 705/8 |

OTHER PUBLICATIONS

Ericson et al. "TIM—A Test Improvement Model", 1997, Software Testing, Verification, and Reliability, vol. 7, pp. 229-246.*
Xenos et al. "CESM: a Perceived Software Quality Assessment Tool", 1999, Proceedings of the $4^{th}$ International Conference on Software Process Improvement—Research into Education and Training, INSPIRE '99.*
Kulkarni et al. "Development and Validation of a Knowledge Management Capability Assessment Model", 2004, Twenty-Fifth International Conference on Information Systems.*

(Continued)

*Primary Examiner* — Jonathan C Teixeira Moffat
*Assistant Examiner* — Lynda Dinh
(74) *Attorney, Agent, or Firm* — Finnegan, Henderson, Farabow, Garrett & Dunner, LLP (57) ABSTRACT

An improved testing assessment tool and methodology maps the Testing Maturity Model (TMM) structure to individual test areas, thereby enabling comprehensive and targeted improvement. In this way, the present invention uses the five TMM maturity levels to assess individual areas, rather than merely assigning a single maturity level to the entire organization. Embodiments of the present invention include a quick assessment that includes a relatively small number of questions to be subjectively answered using the TMM hierarchy. Embodiments of the present invention further include a full assessment that includes a relatively large number of questions to be discretely answered, with these results being use to evaluate various testing areas using the TMM hierarchy.

19 Claims, 7 Drawing Sheets

(56) References Cited

OTHER PUBLICATIONS

Hather et al. "A Method for Application Management Maturity Assessment", 1996, Information and Software Technology 38 pp. 701-709.*

Burnstein et al., "A Model to Assess Testing Process Maturity," Software Technology Support Center, 1998, 10 pages.

Burnstein et al., "A Testing Maturity Model for Software Test Process Assessment and Improvement," Software Quality Professional, vol. 1, No. 4, Sep. 1999, 10 pages.

Official Communication, mailed by the European Patent Office on Mar. 12, 2009, in corresponding Patent Application No. 07022056.1-1225, pp. 1-6.

* cited by examiner

FIGURE 1

PRIOR ART

Test Strategy 310

Test Strategy – 1. Methodology 311

Test Strategy – 2. Environment & Tools 312

Test Strategy – 3. Organization & Communication 313

Test Lifecycle 320

Test Lifecycle – 1. Approach & Planning 321

Test Lifecycle – 2. Design & Preparation 322

Test Lifecycle – 3. Execution & Reporting 323

Testing Disciplines 330

Testing Disciplines – 1. Performance Testing 331

Testing Disciplines – 2. Estimation 332

Testing Disciplines – 3. Test Metrics 333

Testing Disciplines – 4. Project Management 334

Testing Disciplines – 5. Defect Management & Prevention 335

Testing Disciplines – 6. Test Automation 336

Testing Disciplines – 7. Test Data Management 337

Testing Disciplines – 8. Requirements Management 338

Testing Disciplines – 9. Configuration Management 339

| Score 510 | Testing Area 520 |
|---|---|
| | Test Strategy – 1. Methodology |
| | Test Strategy – 2. Environment & Tools |
| | Test Strategy – 3. Organization & Communication |
| | Test Lifecycle – 1. Approach & Planning |
| | Test Lifecycle – 2. Design & Preparation |
| | Test Lifecycle – 3. Execution & Reporting |
| | Testing Disciplines – 1. Performance Testing |
| | Testing Disciplines – 3. Test Metrics |
| | Testing Disciplines – 5. Defect Management & Prevention |
| | Testing Disciplines – 6. Test Automation |
| | Testing Disciplines – 7. Test Data Management |
| | Testing Disciplines – 8. Requirements Management |
| | Testing Disciplines – 9. Configuration Management |

FIGURE 6
600

SOFTWARE TESTING CAPABILITY ASSESSMENT FRAMEWORK

FIELD OF THE INVENTION

As depicted in the figures and as described herein, the present invention provides an automated method and system for evaluating an organization's testing maturity capabilities.

BACKGROUND

Testing is a vital component of the software development process, and provides strong support for the production of quality software. Many organizations have not realized the full potential of their testing processes as evidenced by the relative immaturity of these processes. Process improvement models that are currently available, such as the Capability Maturity Model® (CMM), Capability Maturity Model Integration (CMMI), International Organization for Standardization (ISO) 9001, Bootstrap, and SPICE (ISO 15504) have not adequately addressed testing issues. In response, the Testing Maturity Model$^{SM}$ (TMM) was developed in 1996 at the Illinois Institute of Technology to address testing gaps in these and other known improvements efforts. The purpose of the TMM is to assist software organizations with assessing and improving their software testing processes. The TMM is a compliment to the Capability Maturity Model, and is based on the historical evolution of the testing process and on best industry practices. While a complete understanding of the TMM is beyond the scope of the present discussion, a quick overarea of the TMM is now provided. For more detail on the TMM, please refer to the website http://www.cs.iit.edu/research/tmm.html and to Practical Software Testing: A Process-Oriented Approach by Ilene Burnstein (Springer Press, New York, 1$^{st}$ Edition, 2003).

Figure 1:
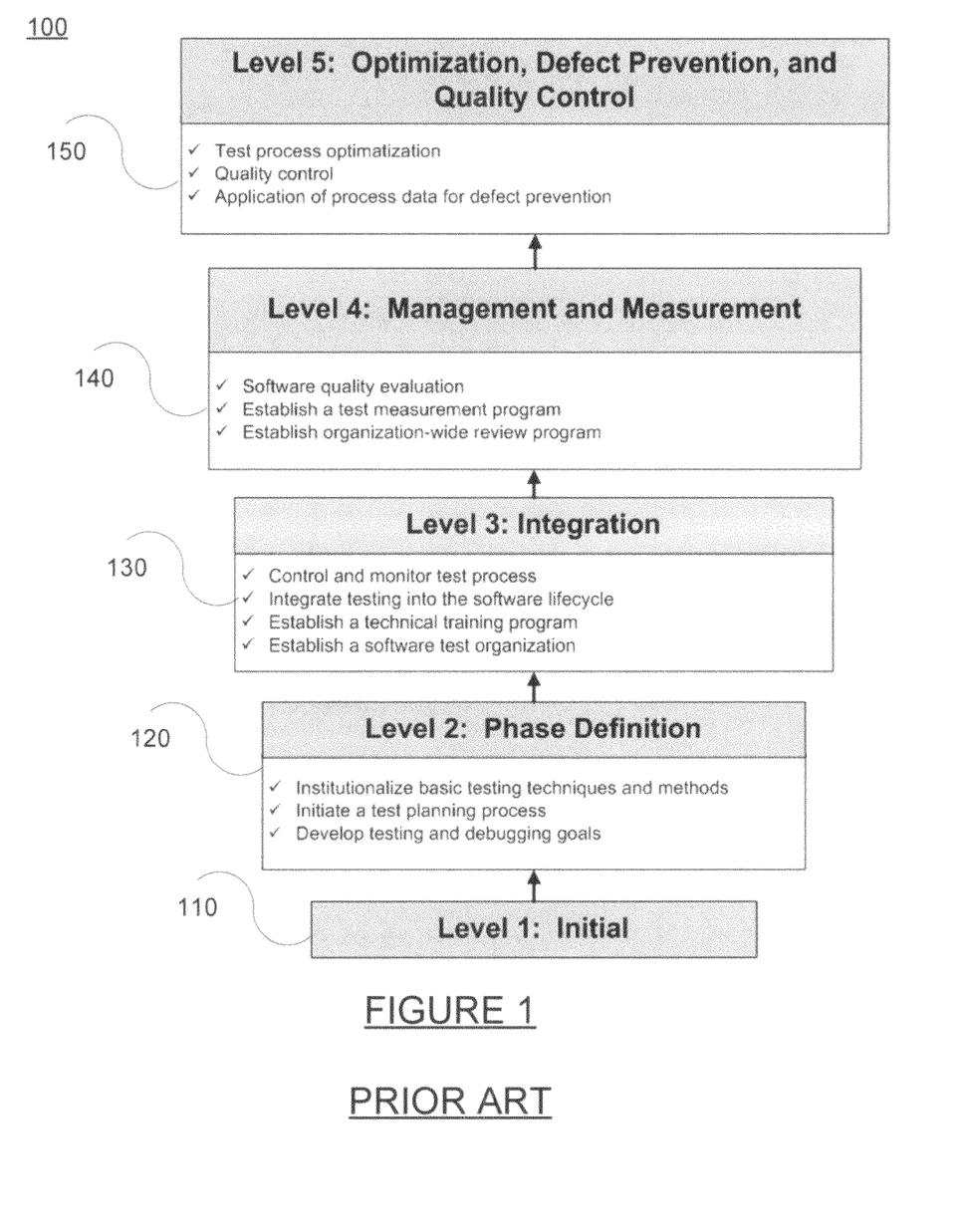
FIG. 1 (PRIOR ART) is a flow chart depicting the five maturity levels of the TMM.

The TMM has two major components, (1) a TMM hierarchy 100 with a set of five levels 110-150 that define testing capability; and (2) An Assessment Model. Each of the TMM levels 110-150 is composed of Maturity Goals, Maturity Subgoals Activities, and Tasks and Responsibilities. The Assessment Model consists of a Maturity Questionnaire with a web-based component, an Assessment Procedure, and Team Selection and Training Guidelines.

As depicted in FIG. 1 (PRIOR ART), the TMM hierarchy 100 takes a 5-staged approach (like the CMM and the CMMI) to testing maturity for organizations, where the TMM maturity goals make up the five TMM Test Maturity Levels 110-150. The TMM structure hierarchy 100 has Maturity Differentiators between the five levels 110-150, and the test maturity differences help to understand test practices of organizations. The differences in the five stages 110-150 of the TMM hierarchy 100 are now summarized below in TABLE 1.

TABLE 1

'Initial level 1' vs. 'Defined level 2'

At TMM level 1 110, organizations struggle between testing and development/debugging, whereas at TMM level 2 120, they recognize and define testing as a distinct discipline 'Defined level 2' vs. 'Integrated level 3'

At TMM level 2 120, organizations start testing with an unpredictable starting situation, whereas at TMM level 3 130, they aim to test & plan testing early in the Software/System development life cycle (SDLC)

TABLE 1-continued

'Integrated level 3' vs. 'Managed/Measured level 4'

At TMM level 3 130, organizations still focus on testing often & everywhere, whereas at TMM level 4 140, they aim to test less by management/control & quality rearea 'Managed/Measured level 4' vs. 'Optimized level 5'

At TMM level 4 140, organizations aim to reduce test effort by management & control, whereas at TMM level 5 150, they aim to reduce effort by automation, statistical testing, but mostly by defect prevention through overall SDLC process improvement It is generally accepted that the TMM concepts are intellectually strong with a sound and comprehensive academic structure. Furthermore, the TMM is aligned with other maturity models such as CMMI, but the TMM improves testing gaps in CMMI and other process models and further provides a basis for evaluating an organization's process testing capabilities (in contrast to the CMMI's focus on evaluating the organization's software creation process).

In practice, an organization may be evaluated using the TMM (or other maturity model) by a skilled individual trained in the maturity model. Specifically, this evaluator reareas the organization according to a series of standards (or requirements) associated with each of the five maturity levels. When an organization satisfies each and every of the requirements for a maturity level, the organization is said to have achieved that particular maturity level. The levels are cumulative in that all of requirements of a lower level must be achieved in order to satisfy the requirements of a higher level. For example, an organization cannot achieve TMM level 3 130 without previously achieving the requirements of TMM level 2 120. In this way, the TMM requires stage-by-stage testing such that an organization needs to show compliance with a lower TMM level before testing can begin to show compliance with a higher level.

The resulting document is generally quite extensive, including detailed analysis of the each of the criteria for each of the stages, along with documentation to verify the ratings. For example, the response for each of the criteria may generally include an explanation for the finding along with supporting documentation for the finding, such as organizational documents showing the existence of various procedures or equipment, as necessitated by the stage requirement.

However, this staged testing methodology limits the practicality of the TMM because it encourages a stage-by-stage compliance, rather than holistic approach to maximize overall testing maturity. Typically, an organization would attempt to satisfy the requirements of one level before proceeding the next higher level even though it is possible to concurrently address the requirements for several levels, even where the requirements from different levels are closely related and could be efficiently addressed together. Other than providing the testing criteria, the TMM also does not help an organization to target specific test improvement opportunities, such as improving testing strategy, test automation, performance testing, requirements management, etc. For these and other reasons, the TMM currently has no large-scale, practical implementation.

For similar reasons, the TMM does not serve as a useful measure of an organization's testing capabilities since it merely provides criteria for completion of a level with no indication of the organization's performance in other levels. For example, if an organization having very mature testing capabilities fails one of the requirements of TMM level 2 120, than that organization would only be TMM level 1 110, even if that organization could otherwise satisfy most requirements for the other TMM levels 2-5 120-150.

SUMMARY OF THE PRESENT INVENTION

In response to these and other needs, the present invention provides an improved testing assessment solution through a test assessment tool and methodology. In the broadest sense, the present invention addresses the deficiencies in the TMM test Assessment Framework by mapping the TMM structure to individual test areas, thereby enabling comprehensive and targeted improvement and value creation. In this way, the present invention uses the five TMM maturity levels from the TMM structure 100 to assess individual areas, rather than merely assigning a single maturity level to the entire organization. This approach enables improved assessment of the entire organization, assessment of the entire testing scope, and a comprehensive and targeted value creation.

Embodiments of the present invention provide a testing maturity assessment system comprising a server connected to a test assessment system for accessing a stored testing capability questionnaire, wherein the testing capability questionnaire comprises at least one question for each of a plurality of testing capability areas, wherein said server provides said stored testing capability questionnaire over a network; a computer connected to the network for receiving and displaying the testing capability questionnaire, wherein said computer accepts a response to each of said questions in said testing capability questionnaire and returns said responses to the server; and a test assessment tool connected to the server for processing the received questionnaire responses, wherein said a test assessment tool calculates a testing maturity score for each of the testing capability areas.

Optionally, each of responses comprises a maturity score rating to each of the questions, and wherein the test assessment tool calculates the testing maturity score for each of the testing capability areas using a weighted average of the maturity score rating for each of the questions associated with that testing capability area.

Alternatively, each of the responses may comprise a true and false answers for each of the questions, and wherein the test assessment tool comprises predefined logic to calculate the testing maturity score for each of the testing capability areas, wherein said predefined logic comprises tallying the number of true and false answers to the questions associated with each testing capability area.

The server optionally accesses and provides first and second stored testing capability questionnaires, wherein each of responses to the first questionnaire comprises a maturity score rating to each of the questions of the first questionnaire, and wherein the test assessment tool calculates a first testing maturity score for each of the testing capability areas using a weighted average of the maturity score rating for each of the questions from the first questionnaire associated with that testing capability area, and each of the responses to the second questionnaire comprises a true and false answers for each of the questions to the second questionnaire, and wherein the test assessment tool comprises predefined logic to calculate a second testing maturity score for each of the testing capability areas, wherein said predefined logic comprises tallying the number of true and false answers to the questions associated with each testing capability area.

The tool may further include stored testing assessment data to assist the organization to complete the questionnaire, said data comprising questionnaire instructions and definitions of testing assessment terms.

The test assessment tool may produce a graphical display of the testing maturity score for each of the testing capability areas.

In embodiments, the testing maturity score for each of the testing capability areas is a real number between 1 and 5, corresponding to the test maturity levels of the testing maturity model (TMM).

The questionnaire further includes a comment input field for each of the questions.

The questionnaire may further comprise an application to automatically calculate a response to one or more of said questions. The application may search stored data connected to the computer. Accordingly, the questionnaire further includes a comment input field for each of the questions, wherein the application identifies in the comment section the location of any relevant data connected to the computer.

Other embodiments include a testing maturity assessment method comprising the steps of: defining a plurality of testing capability areas; defining at least one question for each of the testing capability areas; collecting data to answer each of the questions; and analyzing the collected answer data to assign a testing maturity score for each of the testing capability areas.

In the testing maturity assessment method, the collected data may comprises a maturity score rating for each of the questions, and wherein the testing maturity score for each of the testing capability areas either (1) comprises a weighted average of the maturity score rating for each of the questions associated with that testing capability area or (2) is calculated by predefined logic that comprises tallying the number of true and false answers to the questions associated with each testing capability area.

The testing maturity capabilities areas comprise test strategy, test lifecycle, and test disciplines.

In another embodiment the invention is a computer-readable medium having computer-executable instructions for a testing maturity assessment system stored thereon for defining a plurality of testing capability areas; defining at least one question for each of the testing capability areas; collecting data to answer each of the questions; and analyzing the collected answer data to assign a testing maturity score for each of the testing capability areas.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein.

DETAILED DESCRIPTION OF THE PREFERRED EMBODIMENTS

As depicted in the figures and as described herein, the present invention provides an improved method and system for evaluating an organization's testing maturity capabilities.

Figure 2A:
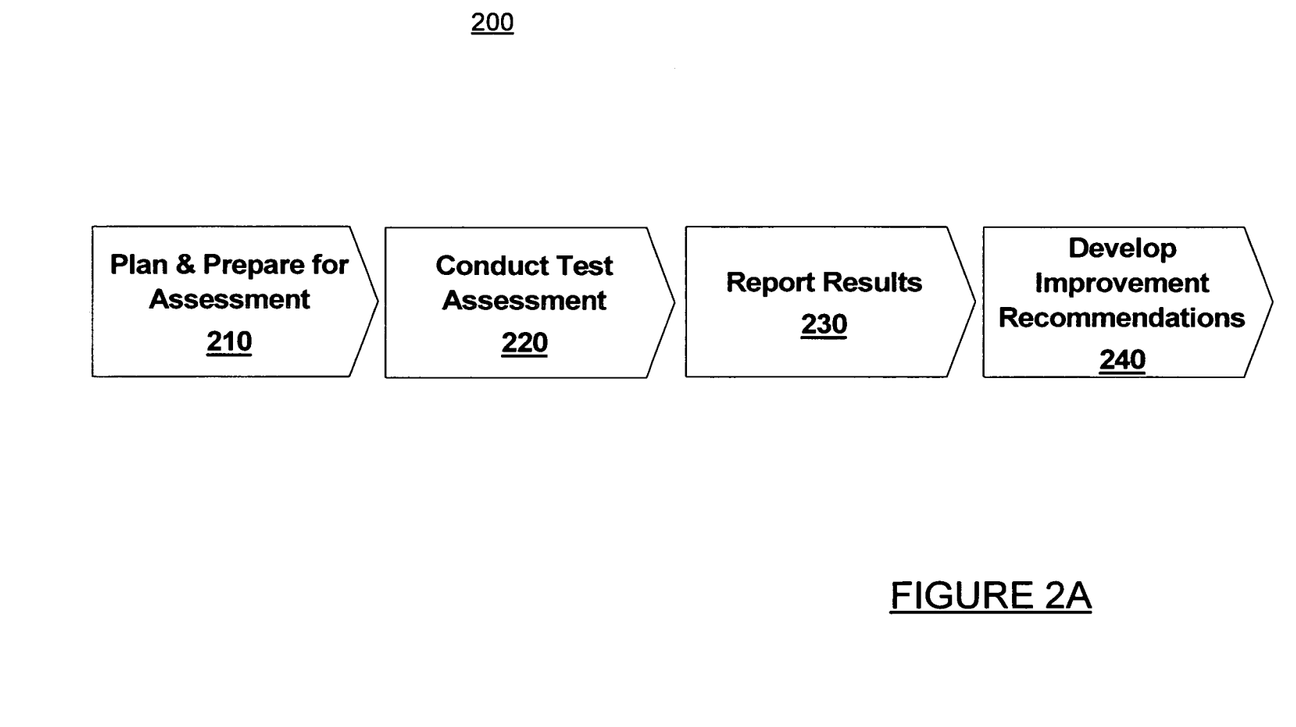
FIGS. 2A-2B are flow charts depicting the steps in the testing capability assessment method in accordance with embodiments of the present invention.

Turning now to FIG. 2A, embodiments of the present invention provide a testing maturity assessment method 200. The testing maturity assessment method 200 begins with a planning and preparing for assessment step 210 which generally includes developing an assessment plan, selecting and preparing an assessing individual or team, and then obtaining and rearea relevant evidence, such as conducting interareas. As described in greater detail below, these sub-processes may be performed manually or using automated tools. The testing maturity assessment method 200 continues with conducting a testing assessment in step 220 using the data collected in step 210. Specifically, the conducting of a testing assessment in step 220 generally includes verifying and validating the evidence, and then examining the evidence, generating results, and documenting any findings. The results from the test assessment step 220 are reported in step 230 to deliver the assessment results to the organization. Next, in step 240, improvements are recommended based upon an evaluation of the assessment results to identify and prioritize improvement suggestions to develop an improvement plan to achieve the organization's desired testing maturity.

Figure 2B:
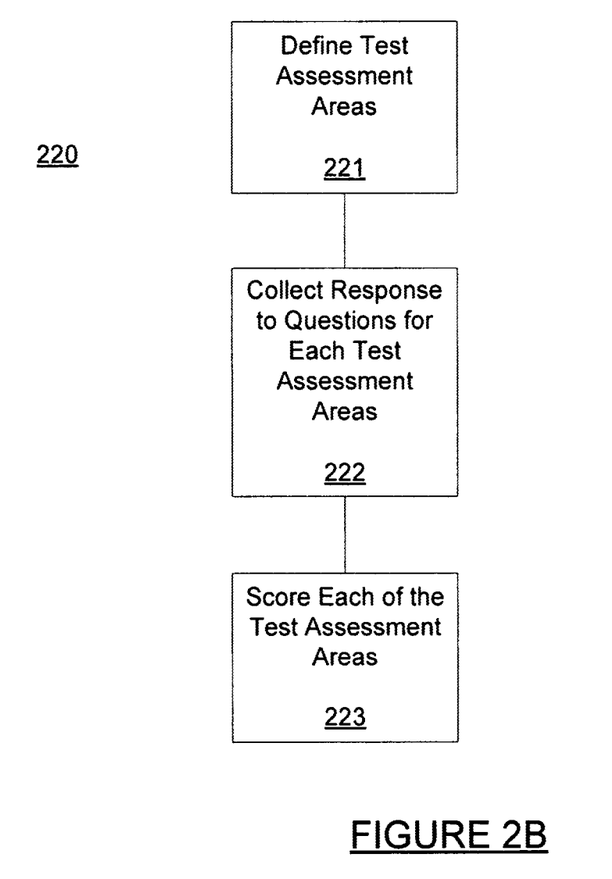

Referring now to FIG. 2B, the test capability assessment step 220 is described in greater detail. Specifically, the testing assessment step 220 generally includes defining various testing maturity areas in step 221, collecting responses to questions associated with each of the testing maturity areas in step 222, and then scoring the organization in each of the test maturity areas in step 223. The testing maturity areas may be defined in step 221 as needed according to various known techniques and methodologies. For example, several testing capability areas may be defined, and for each of the testing capability areas, further testing capability sub-areas may be further defined. In this way, the present invention may be adapted for various maturity and process models for various industries. For example, the testing maturity areas defined in step 221 may correspond to the various testing maturity criteria used in the TMM. The definition of the testing maturity areas in step 221 is described in greater detail below.

The Test Assessment methodology 200 may further allow a user to select among multiple test capability tests in the testing assessment step 220. For example, a preferred implementation of the present invention supports different assessment types, a high-level, short-term assessment for a Quick Assessment (QA) and an in-depth, long-term assessment for a Full Assessment (FA). The Quick assessment allows a user to subjectively answer a smaller set of questions in the test assessment 220 (for example, approximately ten questions per area over each of the fifteen test areas described below in FIG. 3), where the user decides on a rating, and thus, and a test maturity level for each of the questions or testing areas. The rating is subjective, driven by the assessor's interpretation of evidence. Preferably, the ratings for each of the questions correspond to the maturity levels of the TMM, or may include other options such as "Not applicable" or "unknown." For example, the user may use the following considerations for assigning ratings to the Quick Assessment questions:

0: It is clear and/or there is evidence that the factor is not performed     1: It is unclear and/or there is marginal evidence that the factor is performed     2: The factor is performed, but not across the SDLC or not across all projects; i.e. it is not institutionalized     3: The factor is performed and is institutionalized, but management & measurement disciplines are insufficient or not in place     4: The factor is performed, institutionalized, managed & measured, but there is no evidence for continuous evaluation & improvement     5: The factor is performed, institutionalized, managed & measured, and continuously evaluated & improved     N/A (not applicable): The factor should not be included in the rating     Unknown: It is unclear that the factor is performed It is up to the assessor's interpretation and judgment to decide to what extent the criteria phrased in the question are met. For each question, any considerations can be documented under a corresponding notes section. The organization's testing capabilities may then receive a composite score from the quick assessment produced by weighting and averaging the individual scores from each of the quick assessment questions.

In contrast, a full assessment asks the user to answer a larger set of questions (for example, 1500 discrete questions over the fifteen test areas described below in FIG. 3) to produce an accurate testing assessment. The full assessment questions tend to be more objective, in the form of "yes/no" questions. For example, a user may use the following considerations for assigning ratings to the Full Assessment questions:

Yes: There is sufficient evidence to suggest that the criteria phrased in the question are met     No: There is no evidence to suggest that the criteria phrased in the question are met     N/A: The factor should not be included in the rating. NOTE: This will add to a 'Not Applicable' rating and will not add to a 'Satisfied' rating for the Test Area (refer to slide on Scoring Algorithm)

Unknown: There is insufficient evidence to suggest that the criteria phrased in the question are met.

It is up to the assessor's interpretation and judgment to decide to what extent the criteria phrased in the question are met. For each question, any considerations can be documented under the corresponding notes section. Each maturity level may be calculated by a configurable percentage threshold. For example, the user's answers may then translated into composite score through an automated reporting schema, for example, by tallying the number of yes answers and then correlating this tally with a testing capability score for each of the testing areas according to a predefined scoring standard. Similarly, a score may be deduced based upon the percentage of positive answers.

Preferably, the testing capability questions formed in step 221 should be organized such that questions related to criteria for particular TMM maturity level are group together. In this way, the user may receive a rough testing capability maturity estimate through examination of the testing responses. For example, a positive answers to a series questions may strongly indicate the organization's satisfaction of an associated testing maturity level.

Figure 3:
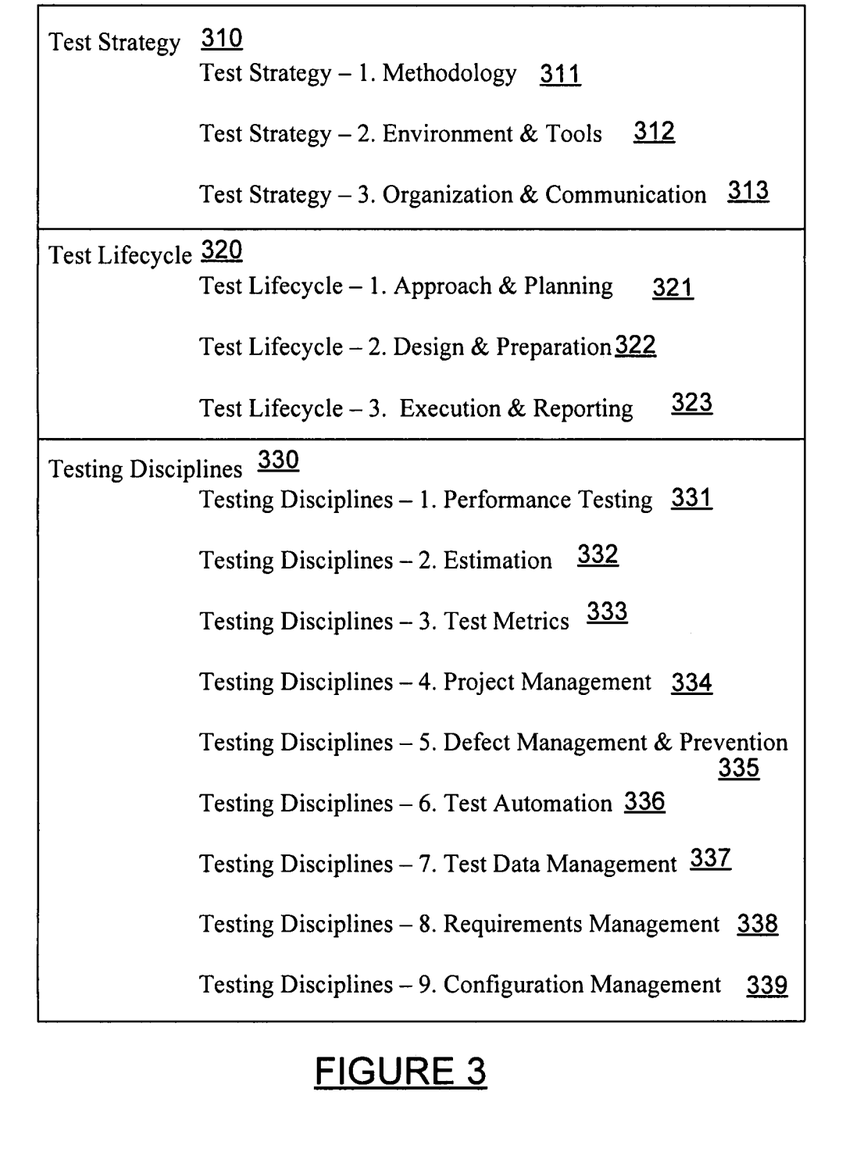
FIG. 3 is a flow chart depicting exemplary testing maturity areas for the testing capability assessment in the testing capability assessment method of FIGS. 2A-2B in accordance with embodiments of the present invention.

Referring now to FIG. 3, each assessment from step 220 in one embodiment preferably contain three Test Domains related to Strategy 310, Lifecycle 320, and Disciplines 330.

However, it should be appreciated that any division and organization of the testing questions may be used as needed. Each of the Test Domains 310, 320, and 330 further contains various test areas and each test area may be divided into various test topics. For example, the strategy test domain 310 may be further divided into a test strategy methodology area 311, a test strategy environment and tools area 312, and a test strategy organization & communication area 313. Similarly, the test lifecycle domain 320 may include a test lifecycle approach & planning area 321, a test lifecycle design & preparation area 322, and a test lifecycle execution & reporting area 323. Further, the testing disciplines domain 330 may include a performance testing area 331, an estimation area 332, a test metrics area 333, a project management area 334, a defect management & prevention area 335, a test automation area 336, a test data management area 337, a requirements management area 338, and a configuration management area 339. Again, it should be appreciated that the test domains may be divided into various testing areas as needed.

The Test Methodology area 311 relates to the overall approach used to verify the assumptions around how to approach, plan, and perform testing; e.g. the V-model can be used as a model in an applied test methodology.

The Environment & Tools area 312 relates to the entire set of artifacts used to support the overall testing effort; e.g. all infrastructure and facilities such as tables, chairs, office supplies, computing infrastructure, and software applications.

The Organization & Communication area 313 relates to the organizational structure in terms of people and the way they communicate in order to perform all test-related activities and fulfill expectations.

The Approach and Planning area 321 relates to the first step in any test stage which contains more detailed information than for example a test strategy. A test approach addresses all major aspects of the test stage that may affect the success of testing.

The Design & Preparation area 322 takes the test approach as a basis and creates all test-related artifacts required for successful test execution; e.g. test scripts, test scenarios, testing software and hardware to support test execution, etc.

The Execution & Reporting area 323 takes the test artifacts created during test design and preparation, executes or runs the tests as defined, and reports test execution progress.

The Performance Testing area 331 relates identifies and fixes system performance issues before the system goes live. This generally includes load testing, stress testing, stability testing, throughput testing, and ongoing performance monitoring.

The Estimation area 332 is the activity that drives the planning of all test activities in terms of effort, scope, and budget.

The Test Metrics area 333 is the measurement of attributes that allows comparison or prediction of a test-related process or product.

The Project Management area 334 is the discipline of organizing and managing resources in such a way that these resources deliver all the work required to complete a project within defined scope, time, and cost constraints.

The Defect Management & Prevention area 335 the discipline of organizing, managing, and preventing problems discovered in a work product or deliverable during a later stage of a project.

The Test Automation area 336 relates to the use of software to control the execution of tests, the comparison of actual outcomes to predicted outcomes, the setting up of test preconditions, and other test control and test reporting functions.

The Test Data Management area 337 relates to a process for test data requisition, acquisition, population, and conditioning required for test execution. The test data management process occurs during the test planning, design & preparation, and execution phases of the testing process.

The Requirements Management area 338 relates to the science and art of gathering and managing user, business, technical, and functional requirements within a product development project.

The Configuration Management area 339 relates to configuration management, which enables the controlled and repeatable management of information technology components as they evolve in all stages of development and maintenance. Configuration Management implements a process for the project teams and stakeholders to identify, communicate, implement, document, and manage changes. When properly implemented, Configuration Management ensures the integrity of the items placed under its control.

Figure 4:
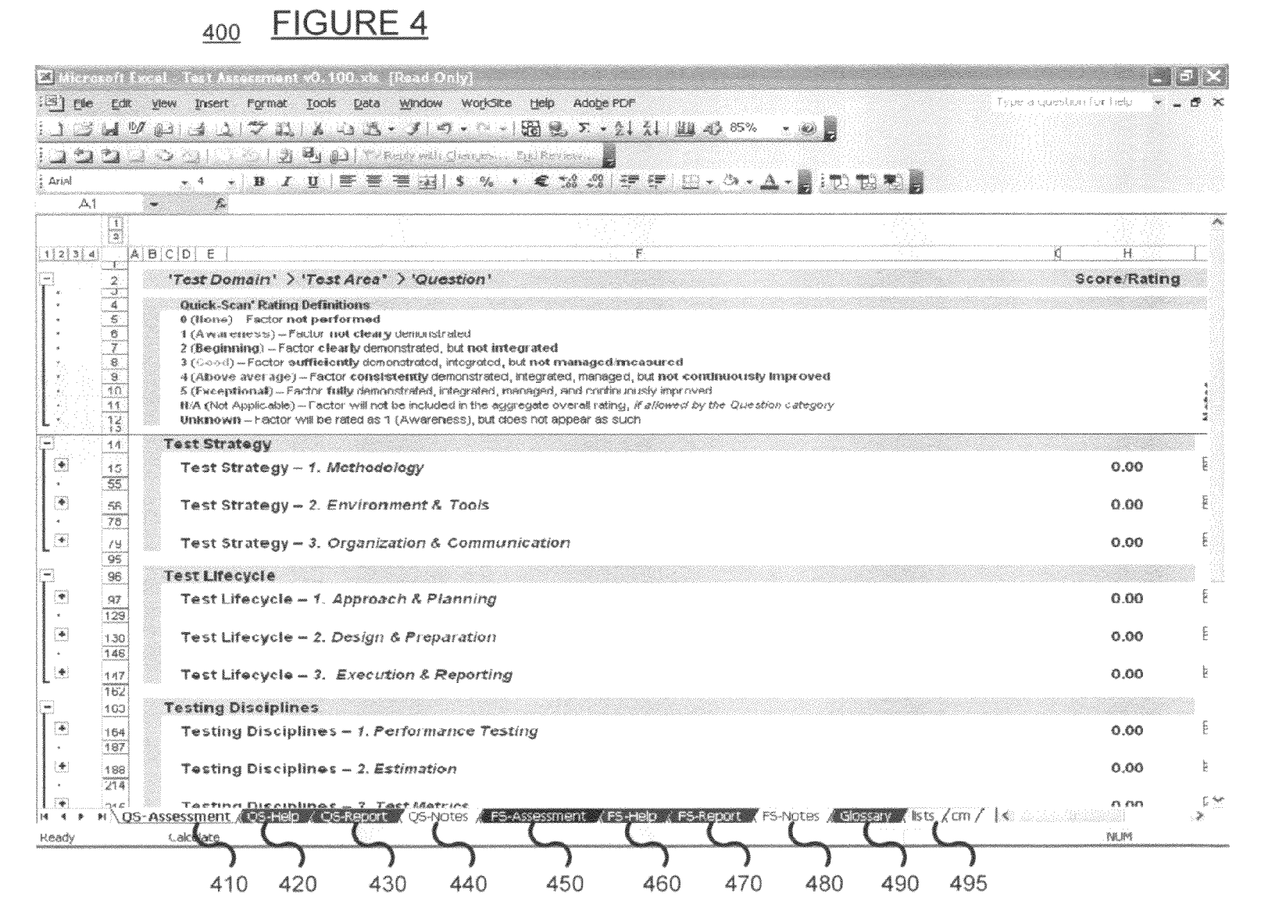
FIG. 4 is a screen shot of a testing capability assessment tool in accordance with embodiments of the present invention.

Turning to FIG. 4, a Test Assessment Tool 400 has been developed with modules to implement the test assessment method 200. Specifically, the depicted the Test Assessment Tool 400 contains tabs to allow a user to access the following sections:

- a QS-Assessment section 410 that includes questions for a Quick Assessment and input fields to receive a user's responses to the questions;
- a QS-Help section 420 that includes instructions and other helpful text for each Quick Assessment question;
- a QS-Report section 430 that creates an automated graph for the Quick Assessment scores for each test area in section 410;
- a QS-Notes section 440 that includes entry fields to allow a user to enter notes for each of the Quick Assessment question in section 410;
- a FS-Assessment section 450 that includes questions for a Full Assessment and input fields to receive a user's responses to the questions;
- a FS-Help section 460 that includes instructions and other helpful text for each Full Assessment question;
- a FS-Report section 470 that includes automated graph for the Full Assessment scores for each test area;
- a FS-Notes section 480 that includes allows entry fields to allow a user to enter notes for each of the Full Assessment question
- a Glossary section 490 that includes comprehensive glossary of testing terms used throughout the Quick and Full Assessment; and
- Optional additional sections 495 that may include, for example a lists section that contains dropdown-list box values used for Quick and Full Assessment ratings for each question and a cm section that contains version history-related information.

In a preferred implementation, the test assessment tool 400 is an application designed in Microsoft Excel® to allow a user to access multiple tabs, each representing a separate spreadsheet contain various relevant information, instructions, or prompts for the user's input to complete a questionnaire.

Referring to the various tools sections referenced in FIG. 4, it should be appreciated that various tools and elements may be added as necessary. For example, recall that an organization's TMM report is an extensive document including extensive documentation to support the various stage requirements findings. In the embodiment depicted in FIG. 4, the notes sections 440, 480 may be used to allow a user to explain an answer to a question and/or to identify the location of documentation to support the finding. Alternatively, if the application is automated, the notes sections 440, 480 may indicate name and the electronic location for the relevant supporting documentation.

Figure 5:
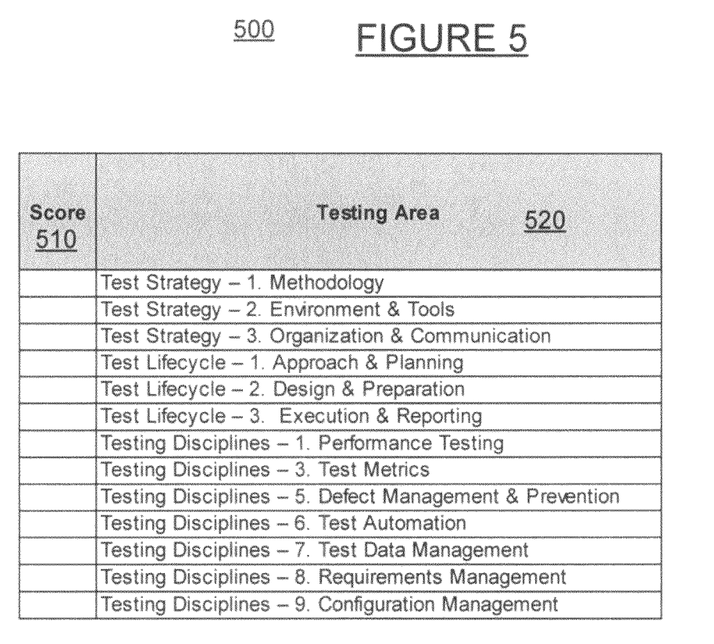
FIG. 5 is an exemplary output display produced by the testing maturity tool of FIG. 4 depicting composite scores in various testing maturity areas produced according to the testing capability assessment of FIG. 3.

Turning to FIG. 5, a testing maturity report 500 is automatically produced by the testing assessment tool 400, for example, following the user's selection of reports sections 430, 470. Using techniques described, or other known techniques, the answers to the various testing questions may be analyzed and converted to a composite real number score for each testing area or domain, or a similar aggregate score for the organization. For example, the testing maturity report 500 includes a separate score 510 for each of the test areas 520. Optionally, the score may be graphically displayed to visually depict the organization's performance in one of the test areas. Furthermore, each maturity level may be further divided into three sublevels ('Low', 'Medium', and 'High') to give more granularity to the graphical structure.

Figure 6:
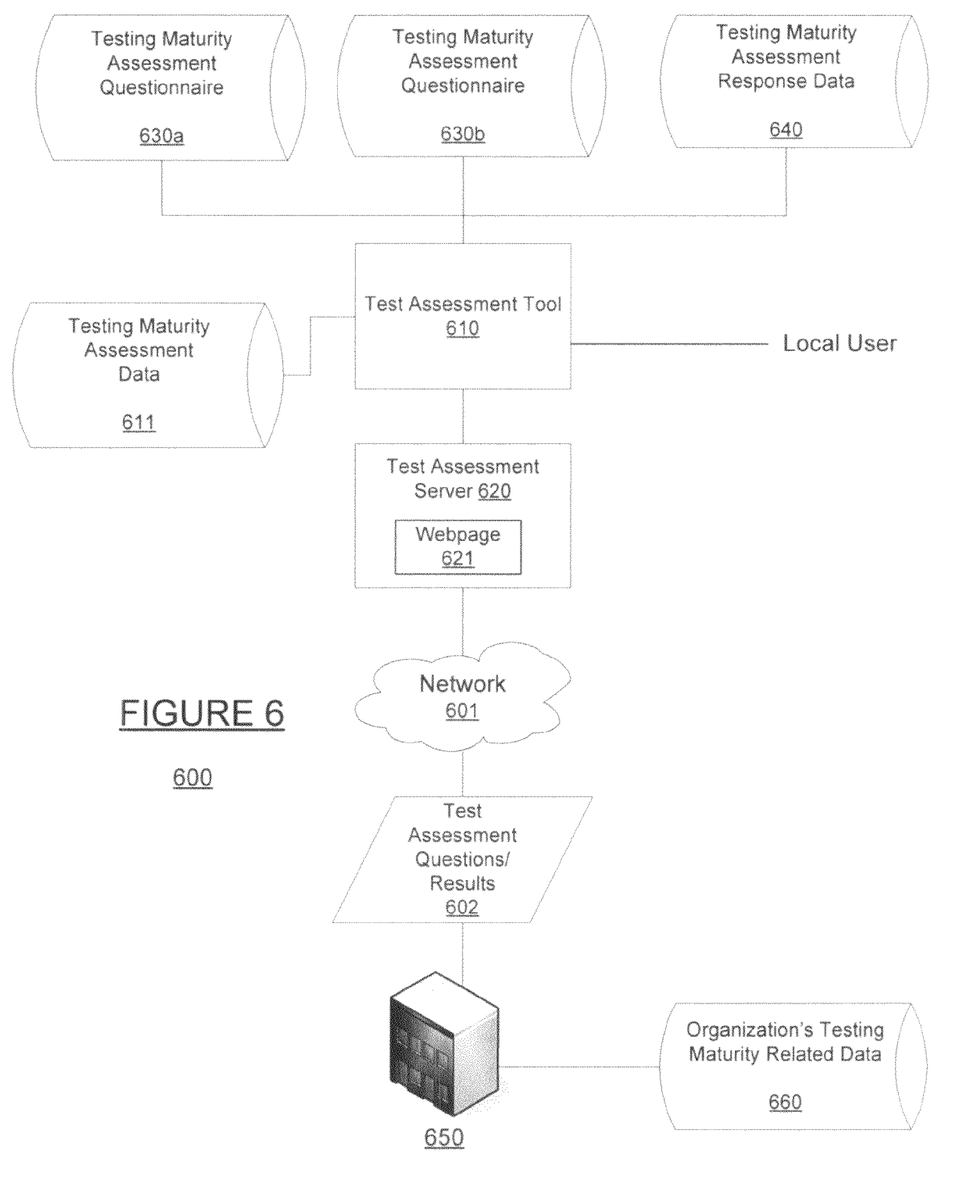
FIG. 6 is a testing capability assessment network implementing the testing capability assessment tool of FIG. 4 in accordance with embodiments of the present invention.

A Test assessment tool 610 in accordance with embodiments of the present invention may be integrated into a test assessment network 600 as depicted in FIG. 6. The test assessment tool 610 may be accessed locally or to a remote organization over a network 601. The test assessment network 600 generally includes a server 620 that provides a webpage 621 over the network 601 to provide the remote access to the test assessment tool 610 as described in greater detail below. The webpage 621 may provide a graphical display similar to the screenshot of the test assessment tool 400 presented above in FIG. 4. In particular, the test assessment tool 610 in this particular embodiment may access testing maturity assessment data 611 contains logic that dynamically directs the creation of the webpage 621 in response to a user request received from a application (such as a browser) operating the remote organization 650. The testing maturity assessment data 611 may further contain additional information, such as definitions of key terms. For example, the webpage 621 may provide by default the screenshot of the test assessment tool 400 presented above in FIG. 4. The user may select one of the tabs 410-495, and in response, the test assessment tool 610 directs the creation of an appropriate webpage 621 to be sent to the remote location 450 in the form of digital data 602 transmitted over the network 600.

If the application at remote location 650 requests a questionnaire, the test assessment tool 610 may access one of its stored testing maturity assessment questionnaires 630a, 630b (corresponding, for example, to the above-described quick and full assessments). The accessed questionnaire may then be incorporated into the webpage 621 and forwarded to the remote location 650 as the digital data 602 that includes data or an application to instruct a computer at the remote location 650 to form the transmitted webpage 621 including various data input fields. In response to the transmitted webpage, the user at the remote location 650 may collect organizational data 660 to complete the questionnaire. The digital data 602 may further include executable code, such as data collection and analysis programming to automatically seek out, identify and collect relevant data 660 related to the organization's testing maturity.

Once the questionnaire is completed, the remote location 650 returns the completed questionnaire (including the collected organizational data 660) to the server 620, again as data 602. This testing maturity assessment response data 640 is collected and stored for analysis according to predefined logic in the test assessment tool 610. For example, test assessment tool 610 may use the testing maturity assessment response data 640 to form a remotely accessible webpage 621 containing the testing maturity report 500 described above in FIG. 5.

The system 600 allows for the testing results 602 to be transmitted in a more efficient manner since the answers to the questions can be represented in an efficient form. For example, the Boolean answers to the true/false full assessment questions may be answered in a single bit, and the rating answers (ranking the organization on a scale of 1-5 in a variety of categories) to the quick assessment question may be represented with 3 bits. Similarly, the location of supporting documentation may accompany the question answers in the form of short stored files location pointer. In this way, responses to a questionnaire may be returned in an extremely compressed format as needed preserve bandwidth and to expedite transmissions. This can be contrasted to the extensive current TMM reports described in the background section that would require much larger transmissions.

In this way, it can be seen that the depicted test assessment network allows for the automated presentation and related data collection for a testing assessment. The particular type of testing assessment (e.g., quick or full) depends on the remote user's selection. The questionnaire results are then scored automatically to produce testing maturity scoring various testing domains and events, and these results may be displayed to the organization. The organization may then use the results to identify areas of need, such as identify testing areas of relatively low score that may otherwise prevent the organization from achieving desired testing maturity levels. Stored suggestions in the testing maturity assessment data 611 may also be forwarded to the user, in response to the scores produced in response to the collected testing maturity assessment response data 640.

CONCLUSION

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

The invention claimed is:

1. A testing maturity assessment system comprising:
   a server connected to a test assessment system for accessing a stored first testing capability questionnaire and a stored second testing capability questionnaire, wherein the first testing capability questionnaire comprises at least one question for each of a plurality of testing capability areas, wherein the second stored capability questionnaire comprises at least one of the questions from the first testing capability questionnaire, and wherein said server provides said stored first testing capability questionnaire and said second stored testing capability questionnaire over a network;
   a computer connected to the network for (1) receiving test-type selection information, and (2) receiving and displaying the first testing capability questionnaire or the second testing capability questionnaire based on the test-type selection information, wherein said computer accepts a response to each of said questions in said first testing capability questionnaire or second testing capability questionnaire and returns said responses to the server; and
   a test assessment tool connected to the server for processing the received questionnaire responses, wherein said test assessment tool calculates a testing maturity score for each of the testing capability areas, wherein each of the responses comprises true or false answers for each of the questions, and wherein the test assessment tool comprises predefined logic to calculate the testing maturity score for each of the testing capability areas, wherein said predefined logic comprises tallying the percentage of positive answers to the questions associated with each testing capability area and correlating the tally with a testing capability score for each of the testing capability areas, wherein the testing capability areas correspond to testing maturity criteria used in a Testing Maturity Model, and wherein the testing capability areas comprise a test methodology area, an environment and tools area, an organization and communication area, an approach and planning area, a design and preparation area, an execution and reporting area, a performance testing area, a project management area, a defect management and prevention area, a test data management area, and a requirements management area, the test methodology area relates to an approach used to plan and perform software testing, the environment and tools area relates to infrastructure and facilities used to support the software testing, the organization and communication area relates to people within an organization and software test-related communication between the people, the approach and planning area relates to addressing all major aspects of the test stage that may affect the success of testing, the design and preparation area relates to software test-related artifacts including hardware and software, the execution and reporting area relates to executing the software testing, the performing area relates to identifying and fixing system performance issues before the software testing, the project management area relates to organizing and managing resources to complete the software testing, the defect management and prevention area relates to organizing, managing, and prevent problems in a work product or deliverable related to the software testing, the test data management area relates to a process for data requisition, acquisition, population, and conditioning required for the software testing, and the requirements management area relates to gathering and managing user, business, technical, and function requirements within a product development project.

2. The testing maturity assessment system of claim 1, wherein each of responses comprises a maturity score rating to each of the questions, and wherein the test assessment tool calculates the testing maturity score for each of the testing capability areas using a weighted average of the maturity score rating for each of the questions associated with that testing capability area.

3. The testing maturity assessment system of claim 1,
wherein if the computer displays the first testing capability questionnaire, each of the responses to the first testing capability questionnaire comprises a maturity score rating to each of the questions of the first testing capability questionnaire, and the test assessment tool calculates a first testing maturity score for each of the testing capability areas using a weighted average of the maturity score rating for each of the questions from the first questionnaire associated with that testing capability area, and wherein if the computer displays the second testing capability questionnaire, each of the responses to the second questionnaire comprises a true and false answers for each of the questions to the second questionnaire, and the test assessment tool comprises predefined logic to calculate a second testing maturity score for each of the testing capability areas, wherein said predefined logic comprises tallying the number of true and false answers to the questions associated with each testing capability area.

4. The testing maturity assessment system of claim 1 further comprising stored testing assessment data to assist the organization to complete the first testing capability questionnaire and the second testing capability questionnaire, said data comprising questionnaire instructions and definitions of testing assessment terms.

5. The testing maturity assessment system of claim 1 wherein the test assessment tool produces a graphical display of the testing maturity score for each of the testing capability areas.

6. The testing maturity assessment system of claim 1 wherein the testing maturity score for each of the testing capability areas is a real number between 1 and 5, corresponding to the test maturity levels of the Testing Maturity Model.

7. The testing maturity assessment system of claim 1, wherein at least one of the first testing capability questionnaire and the second testing capability questionnaire further includes a comment input field for each of the questions.

8. The testing maturity assessment system of claim 1, wherein at least one of the first testing capability questionnaire and the second testing capability questionnaire further comprises an application to automatically calculate a response to one or more of said questions.

9. The testing maturity assessment system of claim 8, wherein the application searches stored data connected to the computer.

10. The testing maturity assessment system of claim 9, wherein at least one of the first testing capability questionnaire and the second testing capability questionnaire further includes a comment input field for each of the questions, and wherein the application identifies in the comment section the location of any relevant data connected to the computer.

11. The testing maturity assessment system of claim 1, wherein the response comprises a subjective rating if the computer displays the second testing capability questionnaire and wherein the response comprises an objective rating if the computer displays the first testing capability questionnaire.

12. The testing maturity assessment system of claim 1, wherein the questions within each of the first testing capability questionnaire and the second testing capability questionnaire are organized such that questions related to criteria for a particular Testing Maturity Model level are grouped together.

13. The testing maturity assessment system of claim 1, wherein the test-type selection information is information related to whether to perform (1) a high-level, short term assessment, or (2) an in-depth, long-term assessment.

14. A testing maturity assessment method comprising the steps of:

defining a plurality of testing capability areas wherein the testing capability areas correspond to testing maturity criteria used in a Testing Maturity Model;

defining at least one question for each of the testing capability areas, wherein the at least one question is defined based on test-type information, the test-type information indicating a selected assessment type from a plurality of assessment types;

collecting data to answer each of the questions; and analyzing the collected answer data to assign a testing maturity score for each of the testing capability areas, wherein the collected answer data comprises true and false answers for each of the questions, and wherein the testing maturity score for each of the testing capability areas is calculated by predefined logic that comprises tallying the percentage of positive answers to the questions associated with each testing capability area, and wherein the testing capability areas comprise a test methodology area, an environment and tools area, an organization and communication area, an approach and planning area, a design and preparation area, an execution and reporting area, a performance testing area, a protect management area, a defect management and prevention area, a test data management area, and a requirements management area, the test methodology area relates to an approach used to plan and perform software testing, the environment and tools area relates to infrastructure and facilities used to support the software testing, the organization and communication area relates to people within an organization and software test-related communication between the people, the approach and planning area relates to addressing all major aspects of the test stage that may affect the success of testing, the design and preparation area relates to software test-related artifacts including hardware and software, the execution and reporting area relates to executing the software testing, the performing testing area relates to identifying and fixing system performance issues before the software testing, the protect management area relates to organizing and managing resources to complete the software testing, the defect management and prevention area relates to organizing, managing, and prevent problems in a work product or deliverable related to the software testing, the test data management area relates to a process for data requisition, acquisition, population, and conditioning required for the software testing, and the requirements management area relates to gathering and managing user, business, technical, and function requirements within a product development project.

15. The testing maturity assessment method of claim 14, wherein the collected data comprises a maturity score rating for each of the questions, and wherein the testing maturity score for each of the testing capability areas comprises a weighted average of the maturity score rating for each of the questions associated with that testing capability area.

16. A non-transitory computer-readable medium having computer-executable instructions for a testing maturity assessment system stored thereon comprising:

defining a plurality of testing capability areas, wherein the testing capability areas correspond to testing maturity criteria used in a Testing Maturity Model;

defining at least one question for each of the testing capability areas;

collecting data to answer each of the questions, wherein the at least one question is defined based on test-type information, the test-type information indicating a selected assessment type from a plurality of assessment types; and analyzing the collected answer data to assign a testing maturity score for each of the testing capability areas, wherein the collected answer data comprises true and false answers for each of the questions, and wherein the testing maturity score for each of the testing capability areas is calculated by predefined logic that comprises tallying the percentage of positive answers to the questions associated with each testing capability area, and wherein the testing capability areas comprise a test methodology area, an environment and tools area, an organization and communication area, an approach and planning area, a design and preparation area, an execution and reporting area, a performance testing area, a project management area, a defect management and prevention area, a test data management area, and a requirements management area, the test methodology area relates to an approach used to plan and perform software testing, the environment and tools area relates to infrastructure and facilities used to support the software testing, the organization and communication area relates to people within an organization and software test-related communication between the people, the approach and planning area relates to addressing all major aspects of the test stage that may affect the success of testing, the design and preparation area relates to software test-related artifacts including hardware and software, the execution and reporting area relates to executing the software testing, the performing testing area relates to identifying and fixing system performance issues before the software testing, the project management area relates to organizing and managing resources to complete the software testing, the defect management and prevention area relates to organizing, managing, and prevent problems in a work product or deliverable related to the software testing, the test data management area relates to a process for data requisition, acquisition, population, and conditioning required for the software testing, and the requirements management area relates to gathering and managing user, business, technical, and function requirements within a product development project.

17. The non-transitory computer-readable medium of claim 16, wherein the collected data comprises a maturity score rating for each of the questions, and wherein the testing maturity score for each of the testing capability areas comprises a weighted average of the maturity score rating for each of the questions associated with that testing capability area.

18. The non-transitory computer-readable medium of claim 16 further comprising providing stored testing assessment data to assist in completion of the questionnaire, said data comprising questionnaire instructions and definitions of testing assessment terms.

19. The non-transitory computer-readable medium of claim 16 further comprising producing a graphical display of the testing maturity score for each of the testing capability areas.

* * * * *